(12) United States Patent
Goupil, Jr. et al.

(10) Patent No.: US 6,979,258 B2
(45) Date of Patent: Dec. 27, 2005

(54) POINT CONTACT VALVE SEATS FOR FILM APPLICATIONS

(75) Inventors: Gerald M. Goupil, Jr., N. Tonawanda, NY (US); Mark W. Stevenson, Appleton, NY (US)

(73) Assignee: Delphi Technologies, Inc., Troy, MI (US)

(*) Notice: Subject to any disclaimer, the term of this patent is extended or adjusted under 35 U.S.C. 154(b) by 20 days.

(21) Appl. No.: 10/727,094

(22) Filed: Dec. 3, 2003

(65) Prior Publication Data

US 2004/0134691 A1 Jul. 15, 2004

Related U.S. Application Data

(60) Provisional application No. 60/439,723, filed on Jan. 13, 2003.

(51) Int. Cl.[7] ................................................. B60S 1/54
(52) U.S. Cl. ........................ 454/121; 454/126; 454/143
(58) Field of Search ................................. 454/121, 126, 454/127, 143, 148, 156, 160

(56) References Cited

U.S. PATENT DOCUMENTS

| | | | |
|---|---|---|---|
| 5,105,730 A * | 4/1992 | Smith ........................ 454/161 |
| 5,145,456 A | 9/1992 | Ito et al. ...................... 454/75 |
| 5,154,223 A | 10/1992 | Ishimaru et al. .............. 165/42 |
| 5,160,115 A | 11/1992 | Ito et al. ................. 251/129.12 |
| 5,243,830 A | 9/1993 | Ito et al. ....................... 62/344 |
| 5,326,315 A * | 7/1994 | Inoue et al. ................. 454/126 |
| 5,564,979 A * | 10/1996 | Sumiya et al. .............. 454/121 |
| 5,720,657 A * | 2/1998 | Kamiya et al. ............. 454/121 |
| 5,885,152 A * | 3/1999 | Wardlaw ..................... 454/121 |
| 5,899,262 A * | 5/1999 | Yamaguchi et al. ........... 165/42 |
| 5,901,943 A * | 5/1999 | Tsunoda ..................... 251/294 |
| 5,906,355 A * | 5/1999 | Danieau ..................... 251/326 |
| 5,931,733 A * | 8/1999 | Danieau ...................... 454/69 |
| 5,934,361 A | 8/1999 | Parisi et al. .................. 165/43 |
| 6,045,444 A | 4/2000 | Zima et al. ................. 454/121 |
| 6,074,294 A | 6/2000 | Stevenson ................... 454/121 |
| 6,211,630 B1 | 4/2001 | Enzinna ......................... 318/3 |
| 6,273,811 B1 * | 8/2001 | Pawlak, III ................. 454/156 |
| 6,296,562 B1 | 10/2001 | Uemura et al. ............. 454/121 |
| 6,569,009 B2 * | 5/2003 | Nishikawa et al. ......... 454/121 |
| 2001/0008148 A1 | 7/2001 | Ito et al. ................. 137/625.46 |

FOREIGN PATENT DOCUMENTS

| | | |
|---|---|---|
| DE | 202 06 671 | 8/2002 |
| EP | 0 545 320 | 6/1993 |

OTHER PUBLICATIONS

European Search Report dated May 9, 2005.

* cited by examiner

Primary Examiner—Derek S. Boles
(74) Attorney, Agent, or Firm—Patrick M. Griffin

(57) ABSTRACT

In a ventilation system of a motor vehicle, a film valve can selectively open and close an air path opening defined by a housing with a rib or projection that encircles such opening. The rib can define a point contact between the film valve and the housing when viewed in cross-section. The rib geometry can include substantially straight edges in cross-section and/or can include arcuate edges. Different geometry can define the rib at different cross-sections. The point contact defined between the rib and the film valve substantially reduces noise generated when the film valve moves relative to the rib, especially when the film valve has been subjected to a harsh environment.

15 Claims, 11 Drawing Sheets

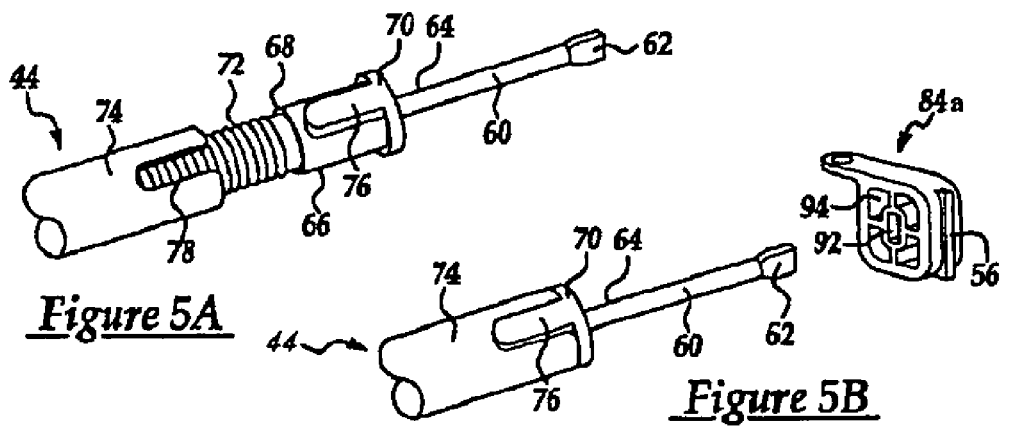
*Figure 5A*
*Figure 5B*
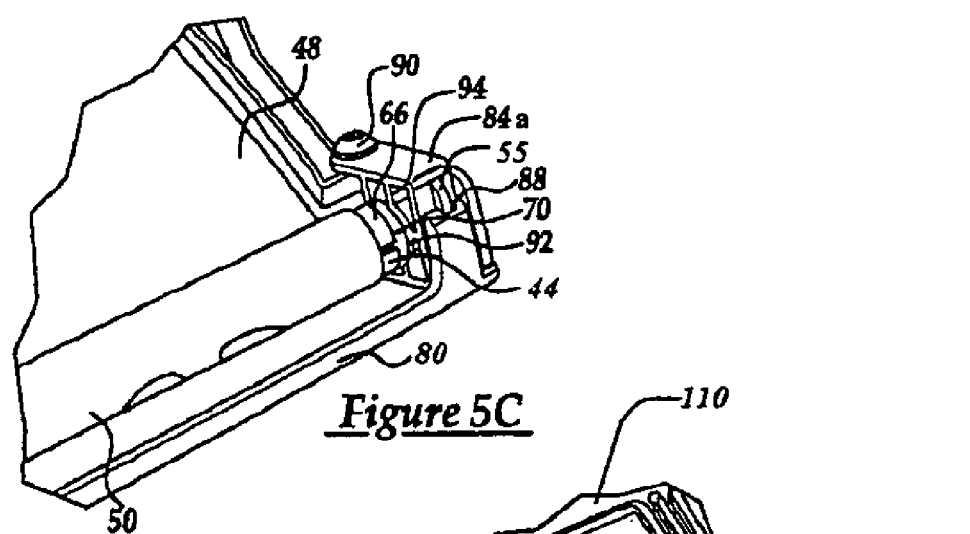
*Figure 5C*
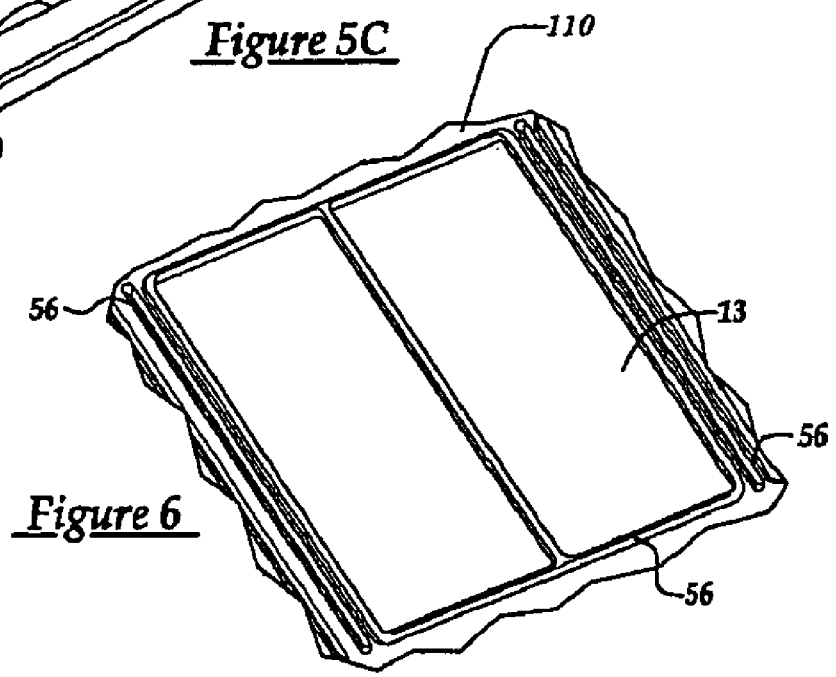
*Figure 6*

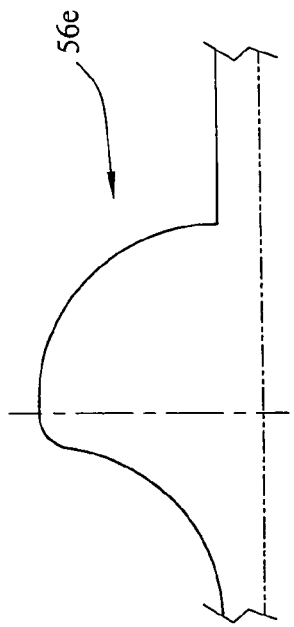
Figure 18
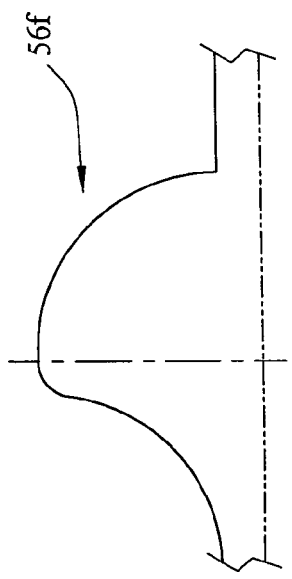
Figure 19
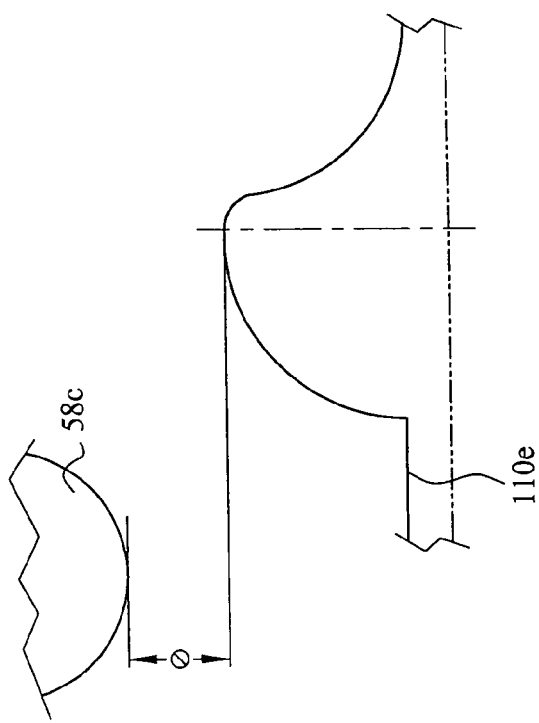
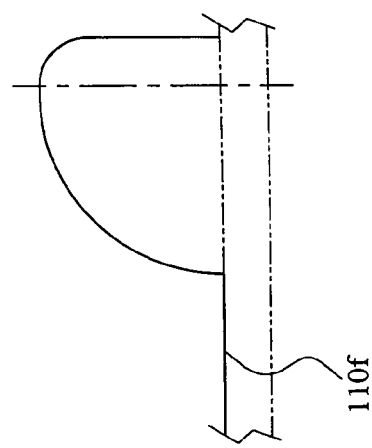

POINT CONTACT VALVE SEATS FOR FILM APPLICATIONS

CROSS-REFERENCE TO RELATED APPLICATIONS

This application claims the benefit of Provisional Patent Application Ser. No. 60/439,723, for POINT CONTACT VALVE SEATS FOR FILM VALVE APPLICATIONS, filed Jan. 13, 2003.

BACKGROUND OF THE INVENTION

1. Technical Field

The present invention generally relates to a film valve assembly and, more particularly, to a film valve assembly for a heating, ventilation and air conditioning system for a vehicle.

2. Decsription of the Prior Art

Conventional heating, ventilation and air conditioning (HVAC) systems for vehicles generally include a housing, an evaporator, a heater core having a housing, an evaporator assembly coupled to the housing, an evaporator, a heater core, an air inlet, a fan and various doors or mode valves for controlling the volume and direction of air flow and generating outlet air of a desired volume and temperature. Together these components receive, temper and direct the flow of forced air through several outlets or vents in the vehicle. The outlets through which the forced air ultimately exits are determined by the various doors which rotate or swing back and forth to open or close off openings and passages and cause air flow to be forced in one direction or another or a combination of both. Air may be directed to various areas of the car depending on the state of the mode valves. For example, air may be forced through outlets directed at the windshield in a defrost or defog mode, or through outlets directed at mid-height level in an air-conditioning mode, or to lower outlets directed to the floor in a heat mode, or various combinations thereof. Although, air of any temperature may be directed to and through any of them.

More recently, designs utilizing a flexible film valve rather than doors have been proposed for controlling volume and direction of air flow. Generally, the flexible film valve is disposed in a frame having rollers. The flexible film valve includes various apertures formed therein, is rolled back and forth over a first roller to cover or uncover various openings and may include an actuator for controlling the roller to wind and unwind the film valve.

Typical film valve designs are disclosed in U.S. Pat. No. 5,160,115 to Ito, et al. and U.S. Pat. No. 6,273,811 B1 to Pawlak, III. The '115 patent discloses an HVAC assembly including a film valve assembly having one roller with a biasing member and a motor. The '811 patent discloses an HVAC assembly including a film valve assembly having two rollers, each with a biasing member and a motor, and each operating a separate film valve. Such designs cause excessive wear on the film valve, the roller and the actuator, thereby increasing costs, and introduce noise in the system due to increased operational efforts required which may be displeasing to the driver of the vehicle.

In addition, the frame in which the film valve is situated typically comprises a static design specifically manufactured to be fitted onto an HVAC housing. Therefore, a frame must be designed and manufactured to meet each HVAC housing design, thereby increasing engineering and tooling cost.

FIG. 7 shows a portion 200 of a prior art ventilation system including a frame 202 defining a plurality of apertures 204, 206, 208, and 210. A fabric member or film valve 212 is wound and unwound relative to drive rollers 214, 216 interior of the frame 202. Idle rollers 218, 220, support the film valve 212 to seal the film valve 212 relative to the apertures 204, 206, 208, and 210. The film valve 212 seals with a flat surface 222 defined by the frame 202.

FIG. 10 shows a frame 202a of a prior art ventilation system defining surfaces 222a, 222b. A film valve (not shown) can slide across the surfaces 222a, 222b during movement relative to the frame 202a. During movement of the fabric member or film valve relative to the frame 202a, a noise is produced when debris becomes entrapped between the film valve 212 and surfaces 222a, 222b when the film valve slides across such surface.

The present invention is aimed at solving one or more of the problems described above.

SUMMARY OF THE INVENTION

The present invention provides a rib extending around an aperture defined by a frame that engages a fabric valve. The rib and fabric valve can seal the aperture of the frame. The rib minimizes the surface area of engagement between the fabric valve and the frame to reduce the noise, friction, and wear resulting from relative movement between the fabric valve and the frame. The rib defines a point of contact with the fabric valve along the cross-section of the rib.

Other applications of the present invention will become apparent to those skilled in the art when the following description of the best mode contemplated for practicing the invention is read in conjunction with the accompanying drawings.

BRIEF DESCRIPTION OF THE DRAWINGS

FIG. 5A is a partially exploded perspective view of the take-up roll, according to an embodiment of the present invention;

FIG. 5B is a perspective view of the take-up roll assembly, according to an embodiment of the present invention;

FIG. 5C is a segmented perspective view of the take-up roll installed in the film valve assembly, according to an embodiment of the present invention;

FIG. 6 is a fragmented view of a portion of the flexible film valve cartridge across which the flexible film translates during operation.

FIG. 18 is a cross-sectional view of a valve seat having a constant rib cross-section;

FIG. 19 is a cross-sectional view of a valve seat having a variable rib cross-section.

DESCRIPTION OF THE PREFERRED EMBODIMENT

Referring to the Figures, wherein like numerals indicate like or corresponding parts throughout the several views, a heating, ventilation and air conditioning (HVAC) system for a vehicle according to one embodiment is generally shown at 10.

Figure 1:
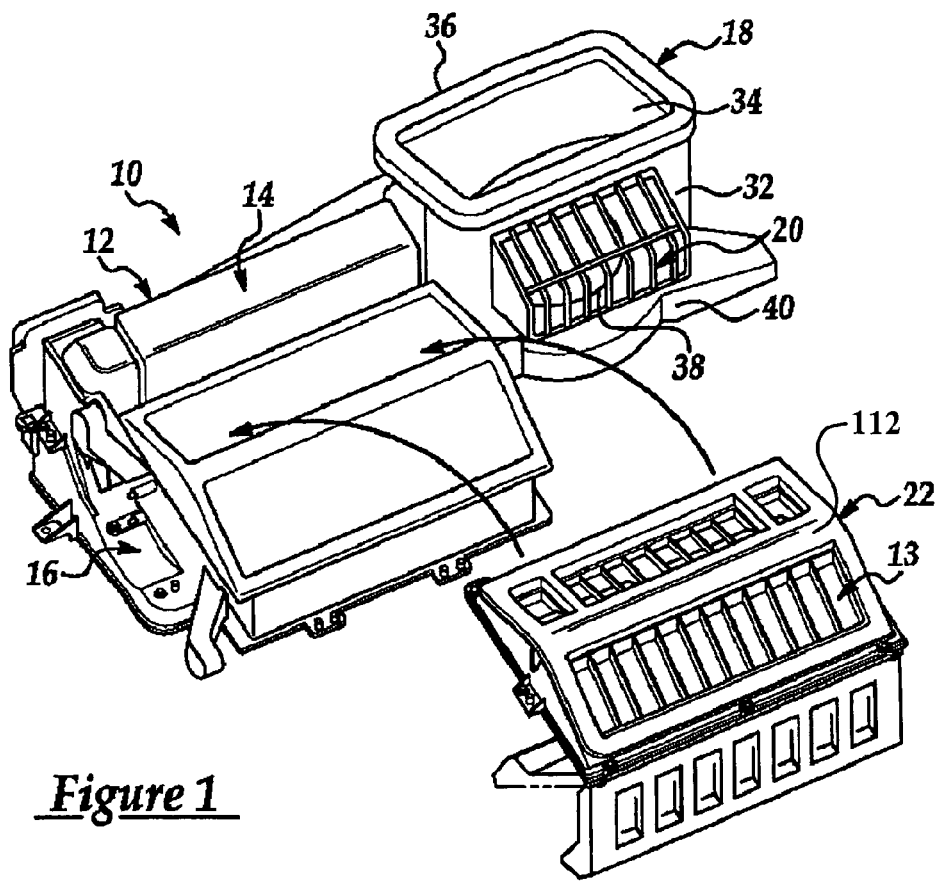
FIG. 1 is a perspective view of a heating, ventilation and air conditioning (HVAC) system having a film valve assembly disposed thereon, according to an embodiment of the present invention.
Figure 2:
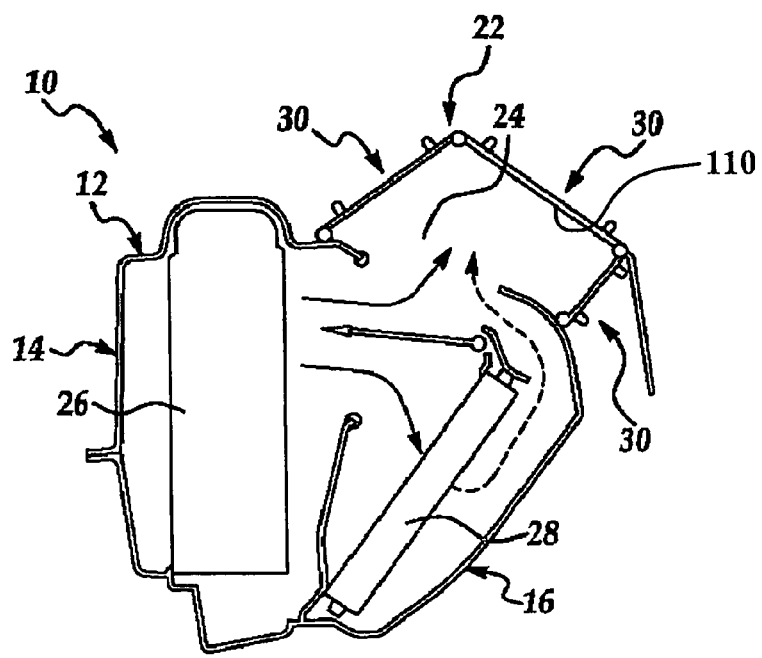
FIG. 2 is cross-sectional view of the HVAC system of FIG. 1, according to an embodiment of the present invention.

Referring to FIGS. 1 and 2 the HVAC system 10 generally includes a housing 12 defining at least one housing aperture 13 therein for directing air to the desired location of a passenger compartment of the vehicle, an evaporator assembly 14 coupled to the housing 12, a heater core assembly 16 coupled to the evaporator assembly 14 and the housing 12, an air inlet assembly 18 coupled to the evaporator assembly 14, a fan assembly 20 disposed on the air inlet assembly 18, and a film valve assembly 22 disposed on the housing 12 for defining an air mixing chamber 24 therebetween.

With continuing reference to FIGS. 1 and 2, the evaporator assembly 14 generally includes an evaporator core 26 enclosed in the housing 12. The heater core assembly 16 generally includes a heater core 28 enclosed in the housing 12. Typically, the evaporator core 26 is located upstream of the heater core 28. Air, either pulled-in outside air or recirculated inside air, enters the air inlet assembly 18 having a passageway 32 defining an aperture 34 at an end 36 thereof. The air is pulled into and forced through the HVAC system 10 by the fan assembly 20 having a fan 38 disposed in a fan housing 40 coupled to the air inlet assembly 18.

Typically, air temperature is controlled and determined by the evaporator core 26, which can be turned on and off along with the rest of the HVAC system 10, and the heater core 28, which is generally always activated and hot. The evaporator core 26 generally extends across the entire width of the case housing 12 such that all the forced air passes through it first, regardless of whether the evaporator core 26 is activated and cold or switched off. The heater core 28 traditionally has a constant flow of engine coolant flowing through it whenever the engine is running. Moreover, the degree of heating of air flow is varied not by varying the temperature of the heater core 28, but by varying the proportion of air flow over and through it.

Air flow routed through the heater core 28 is directed up the back face of the heater core 28 and into the air mixing chamber 24. Within the air mixing chamber 24, any air that has passed straight through the evaporator core 26 is mixed with any air that has been routed through the heater core 28 to achieve a desired temperature. The tempered air is then forced from the mixing chamber 24 through one or more outlets 30 to an area as selected by an operator, such areas including the windshield in a defrost or defog mode, the mid-height level in an air-conditioning mode, the floor in a heat mode, or any combination thereof.

Referring to FIGS. 3A through 5C, the film valve assembly 22, according to an embodiment of the present invention, includes a frame 42, a first roller 44 disposed on the frame 42 having a first biasing device 72 continually urging said first roller 44 to rotate in a first direction under a first constantly applied force, a second roller 46 disposed on the frame 42 having a second biasing device 73 continually urging said second roller 46 to rotate in a second direction under a second constantly applied force, and a film valve or fabric member 48 having a first end 50 disposed on the first roller 44 and a second end 52 disposed on the second roller 46 with the film valve 48 extending therebetween for controlling air flow. The first biasing device 72 and the second biasing device 73 are substantially similar. The film valve 48 defines at least one aperture 54 therein for air flow therethrough. In addition, the frame 42 further may include one or more idle rollers 58 rotatably supported on the frame 42 which supports the film valve 48 and stabilizes the tension of the film valve 48 thereon, as described below.

Referring to FIGS. 5A and 5B, the first roller 44 includes an axle 60. The axle 60 may be a metal rod, a plastic rod or any other suitable type of rod. A first distal end 62 of the axle 60 is flat so as to interface with the frame 42 and ensure that the axle 60 does not rotate, as described below.

With continued reference to FIGS. 5A and 5B, the first roller 44 further includes a cylinder 66 having a hollow end 68 and a beveled end 70. The cylinder 66 further includes a locking rib 76 and may be metal, plastic or any other suitable material. The second end 64 of the axle 60 is disposed on the hollow end 68 and extends therefrom. The first biasing device 72 has one end disposed on the beveled end 70 and has an opposite end affixed to axle 60 for continually urging the first roller 44 to rotate in a first direction under a first constantly applied force. The first biasing device 72 may be a torsion spring, a helical torsion spring or any other suitable member which provides torsional force.

With continued reference to FIG. 5B, a shaft 74 of the roller 44 defining a groove 78 is disposed annularly about the first biasing device 72 and the cylinder 66 such that the locking rib 76 slides into the groove 78. The shaft 74 may be metal, plastic or any other suitable material. Operationally, rotational force applied to the first biasing device 72 is transferred to the shaft 74 to provide rotation thereto.

According to an embodiment of the present invention, the second roller 46 includes the axle 60, cylinder 66, shaft 74a, and the second biasing device 73 continually urging the second roller 46 to rotate in a second direction under a second constantly applied force in a configuration identical to that of the first roller 44. According to one embodiment of the present invention, the first direction is opposite to the second direction. In accordance with yet another embodiment, the first direction is in the same direction as the second direction. The second biasing device 73 may be a torsion spring, a helical torsion spring or any other suitable member which provides torsional force.

With reference to FIGS. 3A, 3B, 5A and 5C, the rollers 44, 46 are disposed on opposite ends 80, 82 of the frame 42 with the first and second ends 50, 52 of the film valve 48 coupled thereto. With reference to FIG. 5C, a cap 84 is disposed on the frame 42 and an end of the second rollers 46 is disposed thereon with the other end of the roller 46 disposed on the frame. The frame 42 includes a slot 88 which receives the cap 84. The cap 84 includes an alignment rib 55 which snaps into the slot 88. The frame 42 may include additional slots and the cap 84 may include additional alignment ribs matching the number of slots. Moreover, the cap 84 may include a fastener 90 for further securing the cap 84 to the frame 42. The fastener 90 may be a screw, a bolt or any other suitable fastener.

With continued reference to FIG. 5B, the cap 84 further includes a key slot 92 and reinforcement ribs 94. The first distal end 62 of the axle 60 fits into the key slot 92 and prevents the axle 60 from rotating upon application of torque to the rollers 44, 46.

Referring to FIGS. 1 through 3B, according to another embodiment of the present invention, the frame 42 includes a first segment 96 and a second segment 98 connected to the first segment 96 for movement relative thereto. The first and second segments 96, 98 may be connected by a first hinge assembly 100 having a stationary member (not shown) and a rotating member (not shown) which rotatably couples the first and second segments 96, 98. The first hinge assembly 100 enables the first and second segments 96, 98 to be repositionable, thereby allowing the frame to change angular shape to be fitted to multiple HVAC assembly configurations and to aid in assembly. The first hinge assembly 100 may be a living hinge or any other suitable hinge. The first and second segments 96, 98 may be connected so as be moveable relative to each other by any other suitable means.

Figure 3A:
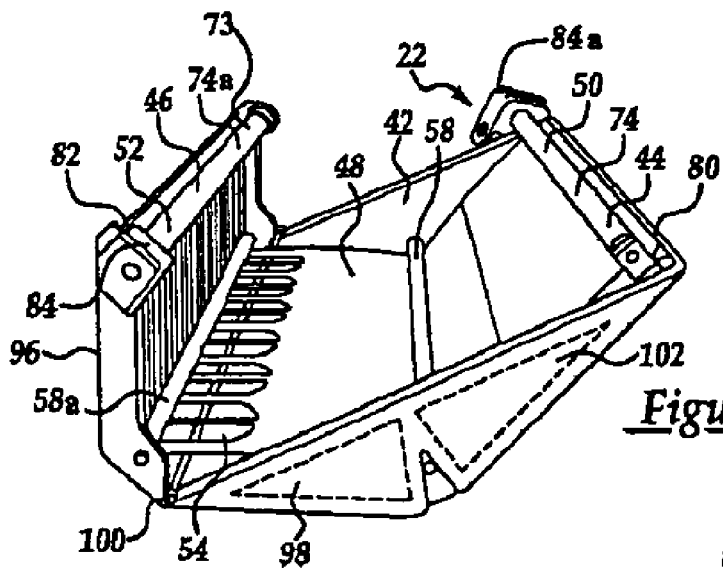
FIG. 3A is a side perspective view of the film valve assembly of FIG. 1, according to an embodiment of the present invention.
Figure 3B:
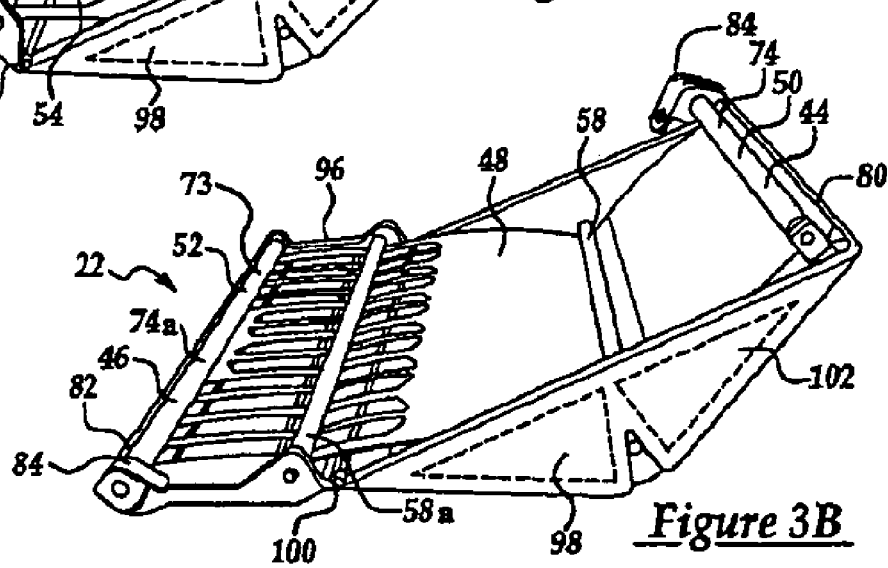
FIG. 3B is a side perspective view of the film valve assembly of FIG. 1 illustrating the rotational aspect of a segment thereof, according to an embodiment of the present invention.

Referring to FIGS. 3A and 3B, the frame 42 may include a third segment 102 rotatably coupled to one of the first and second segments 96, 98 by a second hinge assembly similar to hinge 100 and positioned proximate to idler roller 58. Such a three-segmented configuration permits each segment 96, 98, 102 to be repositionable with respect to each other for improved access or for greater interchangeability between different configurations of HVAC systems. The second hinge assembly may be a living hinge or any other suitable hinge.

The frame 42 being repositionable permits features of the housing 12 to be molded that otherwise would be die locked. Thus, the frame 42 may be adapted to many different geometries and many different vehicles, thereby reducing engineering and tooling costs. Moreover, the repositionable frame 42 in an open position allows easier assembly of the frame 42. As shown in FIG. 3A, the film valve assembly 22 of the present invention is shown in a closed position. As shown in FIG. 3B, the film valve assembly 22 is shown in an open position.

Figure 4:
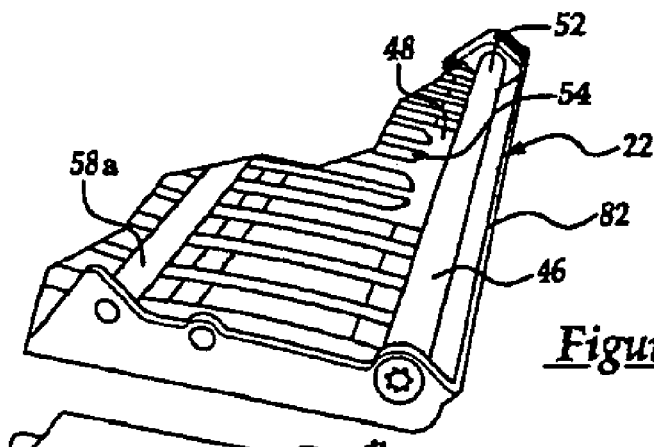
FIG. 4 is a partially exploded side perspective view of a shaft drive source disposed on the film valve assembly of FIG. 3, according to an embodiment of the present invention.
Figure 4:
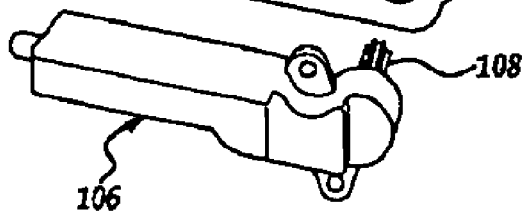

Referring to FIG. 4, an actuator 106 is coupled to HVAC module 10 and to roller 46 thereby providing a non-constant rotational torque coupled to the second roller 46. The actuator 106 may be a stepper motor, a direct current (DC) motor and gears, or any suitable actuator. The actuator 106 includes a rotatable connector 108 which interfaces the actuator 106 to the second roller 46 in female/male engagement and transfers a positive rotational torque from the actuator 106 to the second roller 46. The rotatable connector 108 may have a torx head, a phillips head or any other suitable connector. According to yet another embodiment, an actuator 106 may be coupled to each of the first and second rollers 44, 46.

With reference to FIGS. 1 through 4, the operation of the HVAC assembly 10 according to an embodiment of the present invention will now be described. The HVAC assembly 10 of the present invention utilizes a balanced dual biasing member concept. The first and second biasing devices 72, 73, providing a constant force urging the first and second rollers 44, 46 to rotate, are disposed at the ends of the frame 42. The first biasing device 72 operating at the first roller 44 is pre-tightened and provides the required torque to wind up the film valve 48. The torque of the first biasing device 72 is designed to operate in extreme conditions of temperature and air flow in the module (typically −40 degrees Fahrenheit and high fan speed).

The first biasing device 72 must overcome the frictional forces of the film valve 48 contacting the cartridge 42 and traveling along the frame 42 and also overcome the forces introduced by the bending of the film valve 48 around the rollers 44, 46. The second biasing device 73 on the second roller 46 serves as an assist to the actuator 106 which operates the rotation of the second roller 46. As the film valve 48 winds on the second roller 46, thereby tightening the first roller 44, the actuator 106 must overcome the tension force of the first roller 44 and the frictional forces. With the addition of the second biasing device 73, torque loads on the actuator 106 may be minimized and better balanced.

Upon activation of the actuator 106, the rotatable connector 108 rotates the second roller 46 in the first direction. Upon rotation by the actuator 106 of the second roller 46 and with the assistance of the tension of the second biasing device 73, when a torque great enough to overcome the tension force of the first biasing device 72 is generated, the film valve 48 is wound onto the second roller 46 and off the first roller 44. While winding, the second biasing device 73 in the second roller 46 assists the rotation and reduces the torque required by the actuator 106 to continue winding the film valve 48. Without the assistance of the second biasing device 73, the actuator 106 would be required to be larger and more powerful in order to overcome the resistance of the first biasing device 72 so that the film valve may rotate and align the apertures 54 with the outlets 30 as required to accommodate the direction of air flow as selected by the user.

The net result is that the torque is positive on each roller 44, 46, thereby making the entire assembly 10 more balanced. In addition, torque loads on the actuator 106 are reduced compared to maximum torque in a single spring system.

Referring to FIG. 6, the frame 42 further includes ribs 56 disposed thereon over which the film valve 48 travels, as described below. The ribs 56 reinforce the frame 42 around the housing apertures 13 and prevent the film valve 48 from getting trapped on or pushed through the housing apertures 13. Moreover, the ribs 56 minimize friction created when the film valve 48 travels across the case housing 12 upon rotation, thereby reducing drag and the torque required to rotate the film valve 48.

Referring to FIGS. 1A, 1B, 3A and 3B, the film valve assembly 22 of the present invention includes a frame 42, defining inner 110 and outer 112 surfaces, and at least one housing aperture 13 therewithin for directing air to the desired location of a passenger compartment of the vehicle. The film valve assembly 22 includes a first roller 44 disposed on the frame 42 having a first biasing device 72 continually urging said first roller 44 to rotate in a first direction under a first constantly applied force, a second roller 46 disposed on the frame 42 having a second biasing device 34 continually urging the second roller 46 to rotate in a second direction under a second constantly applied force. The film valve assembly 22 includes a film valve 48 having a first end 50 disposed on the first roller 44 and a second end 52 disposed on the second roller 46 with the film valve 48 extending therebetween for controlling air flow. The film valve 48 includes a fabric.

The film valve 48 defines at least one aperture 54 therein for airflow therethrough. In addition, the frame 42 further may include one or more idle rollers 58 rotatably supported on the frame 42 which supports the film valve 48 and stabilizes the tension of the film valve 48 thereon, as described below. The frame 42 being repositionable permits features of the housing 12 to be molded that otherwise would be die locked.

As appreciated by those skilled in the art, the frame 42 may be adapted to many different geometries and many different vehicles, thereby reducing engineering and tooling costs. Moreover, the repositionable frame 42 in an open position allows easier assembly of the frame 42. As shown in FIG. 3A, the film valve assembly 22 of the present invention is shown in a closed position. As shown in FIG. 3, the film valve assembly 22 is shown in an open position.

Referring to FIG. 4, an actuator 106 is coupled to roller 46 thereby providing a non-constant rotational torque coupled to the second roller 46. The actuator 106 may be a stepper motor, a direct current (DC) motor and gears, or any suitable actuator. The actuator 106 includes a rotatable connector 108 that interfaces the actuator 106 to the second roller 46 in female/male engagement and transfers a positive rotational torque from the actuator 106 to the second roller 46.

Referring to FIG. 6 of the present invention, each of the apertures 13 further includes ribs 56, extending from the inner surface 110 of the frame 42, positioned around each aperture 13 over which the film valve 48 travels. The ribs 56 prevent the film valve 48 from getting trapped on or pushed through the apertures 13 defined within the frame 42. Moreover, the ribs 56 minimize friction created when the film valve 48 travels across the housing 12 upon rotation of the rollers 44, 46, thereby reducing drag and the torque required to rotate the rollers 44, 46.

Figures 7, 8:
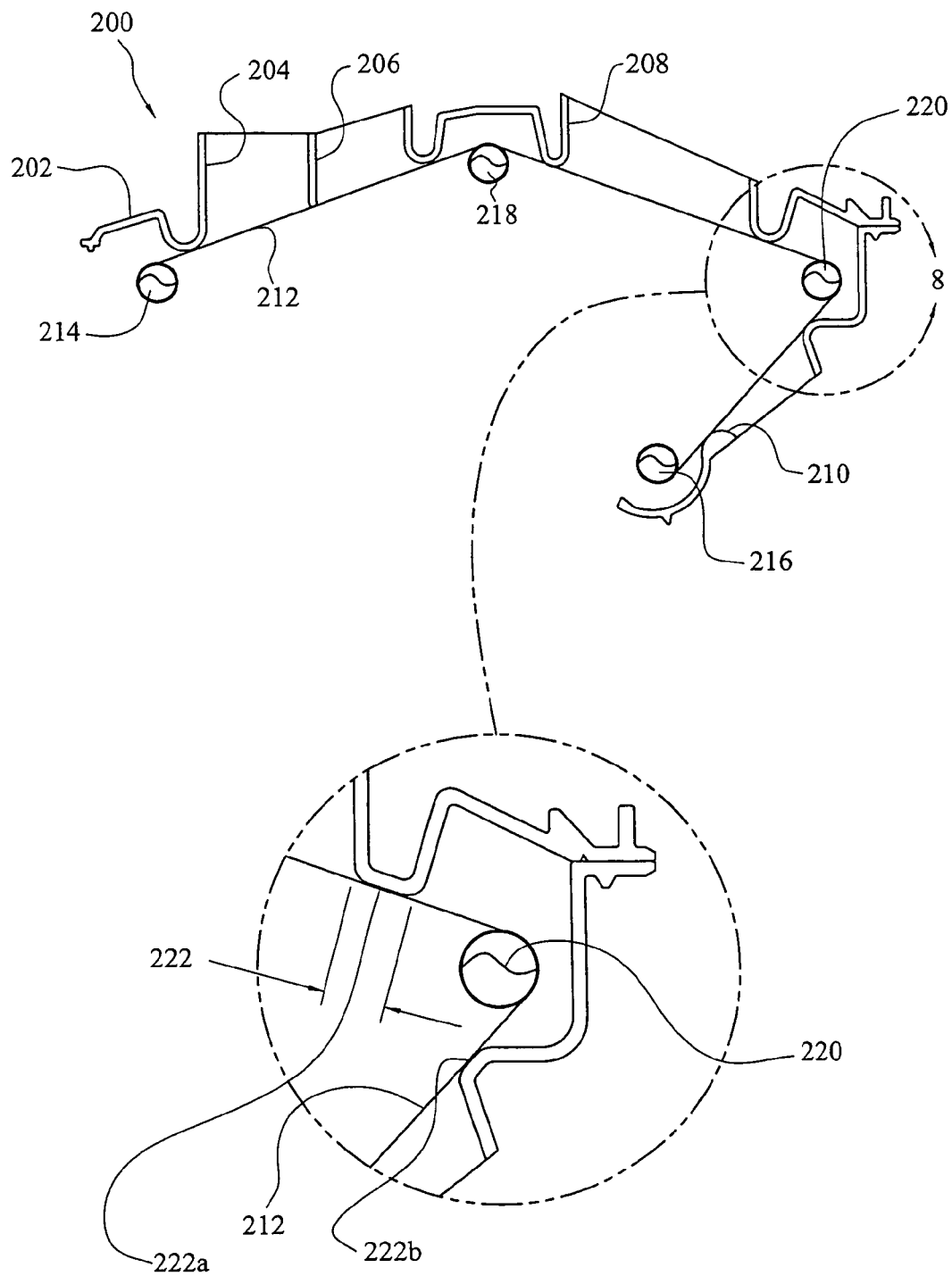
FIG. 7 is a cross-sectional view of the prior art film valve assembly.
FIG. 8 is an enlarged view of a portion of FIG. 7.
Figure 9:
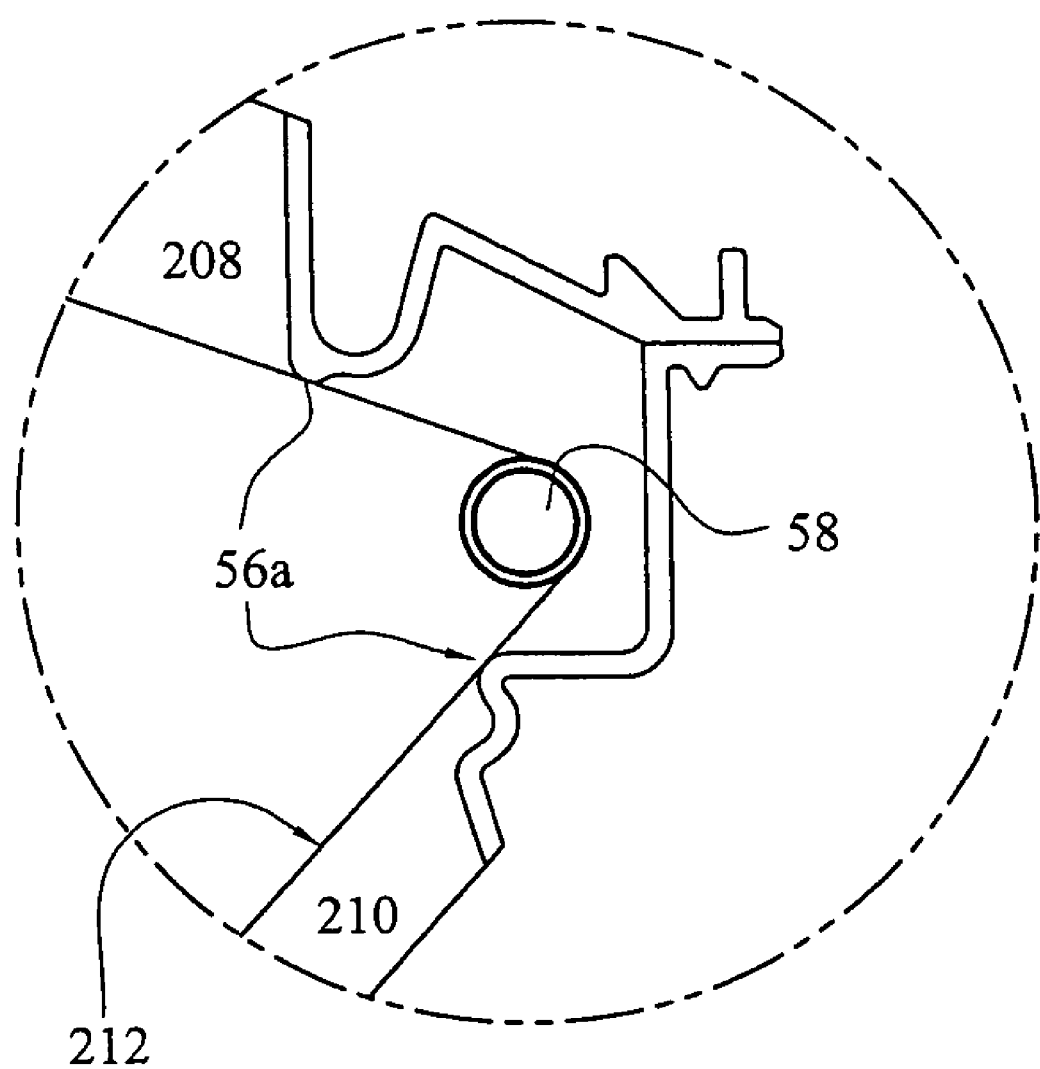
FIG. 9 is a cross-sectional view of a film valve assembly according to the present invention, illustrating a point contact contour.
Figure 10:
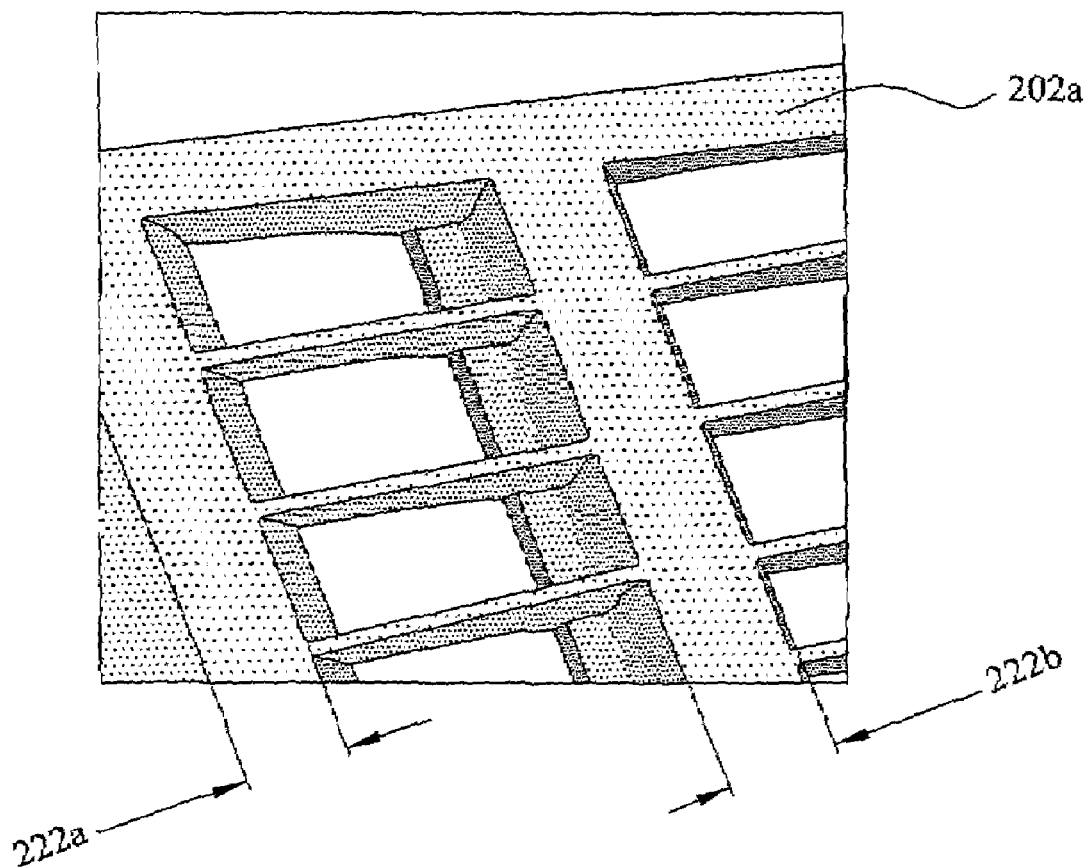
FIG. 10 is a perspective view of prior art seats for a film valve.

Referring now to FIG. 9, the ribs 56 define a valve seat, defined by the ribs 56, wherein the flat portion of the prior art valve seat, as illustrated in FIGS. 7–8 and 10, is replaced with a point contact contour, thereby creating a point contact seat for the film valve 48. The point contact contour 50 of the rib 56 reduces the contact area between the film valve 48 and the frame 42. One of ordinary skills in the art will appreciate that to provide for areas of "point" contact between the film valve 48 and the inner surface 110 of the frame 42, an extra plastic is removed from the inner surface 110 to create the rib 56a with the point contact contour 50 around each of the apertures 13 defined within the frame 42.

A Module Level Debris Test, in which debris similar to those found airborne in harsh environments was introduced into the HVAC module through the air inlet while the blower fan and fan were at high speed, was conducted between the old design, featuring flat valve seats and the point contact valve seats of the present invention that determined significant differences between the designs. Furthermore, a reduction of a contact between the fabric of the film valve 48 and the point contact valve seats defined by the ribs 56 of the present invention, reduces sliding related noises and yields improvement over the prior art design without yielding trade-offs of valve flutter and leakage during the use of the HVAC system 10 of the vehicle.

Figure 20:
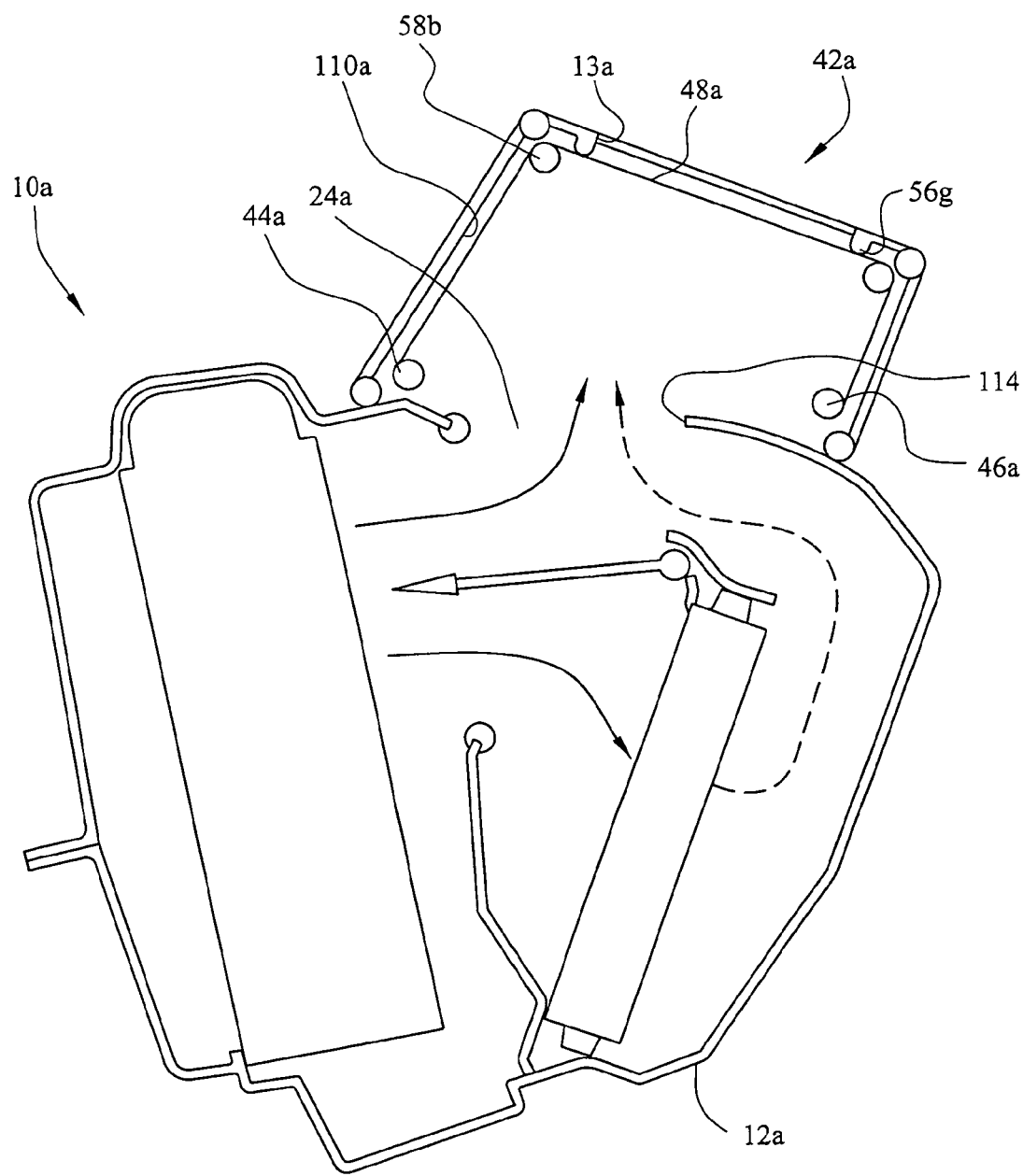
FIG. 20 is a cross-sectional view of an embodiment of the invention.

Referring now to FIG. 20, the present invention provides a valve for a ventilation system 10a of a motor vehicle, the valve including a frame 42a. The ventilation system 10a can include a housing 12a, an inlet (18 shown in FIG. 1), an outlet 114, and a mixing chamber 24a adjacent to the outlet 114. The frame 42a can be connected to the housing 12a and enclose the outlet 114. The frame 42a includes an interior surface 110a and a first aperture 13a. The first aperture 13a communicates with the outlet 114 of the housing 12a. The valve also includes a fabric member 48a suspended across the first aperture 13a. The fabric member 48a can be suspended and moved across the aperture 13a with rollers, pulleys, cords, or gears. By way of example only and not limitation, first and second drive rollers 44a, 46a can be supported for rotation by the frame 42a and be disposed at opposite ends (80, 82 shown in FIGS. 3A–3B) of the frame 42a. The fabric member 48a can be wound and unwound with the first and second rollers 44a, 46a.

The valve can include an idle roller 58b supported for rotation by the frame 42a. The fabric member 48a can extend between the idler roller 58b and the interior surface 110a of the frame 42a. As best shown in FIG. 18, the idle roller 58c can be offset a distance +/−∅ from the top of the rib 56f. The distance ∅ can be between 0.2 millimeter and 2.0 millimeter. The idle roller 58b can be disposed between the first and second drive rollers 44a, 46a.

The fabric member 48a can include one or more apertures that can be aligned with the aperture 13a to define an open position. For example, when an aperture defined by the fabric member 48a is at least partially aligned with the aperture 13a, an air stream can pass from the mixing chamber 24a through the aperture 13a.

The valve also includes a rib 56g projecting from the interior surface 110a of the frame 42a. The rib 56g defines the valve seat of the valve. The fabric member 48a is in sealing engagement with the rib 56g. The rib 56g defines a point contact or point contour that minimizes the cross-sectional area of sealing engagement between the fabric member 48a and the valve seat.

Figure 11:
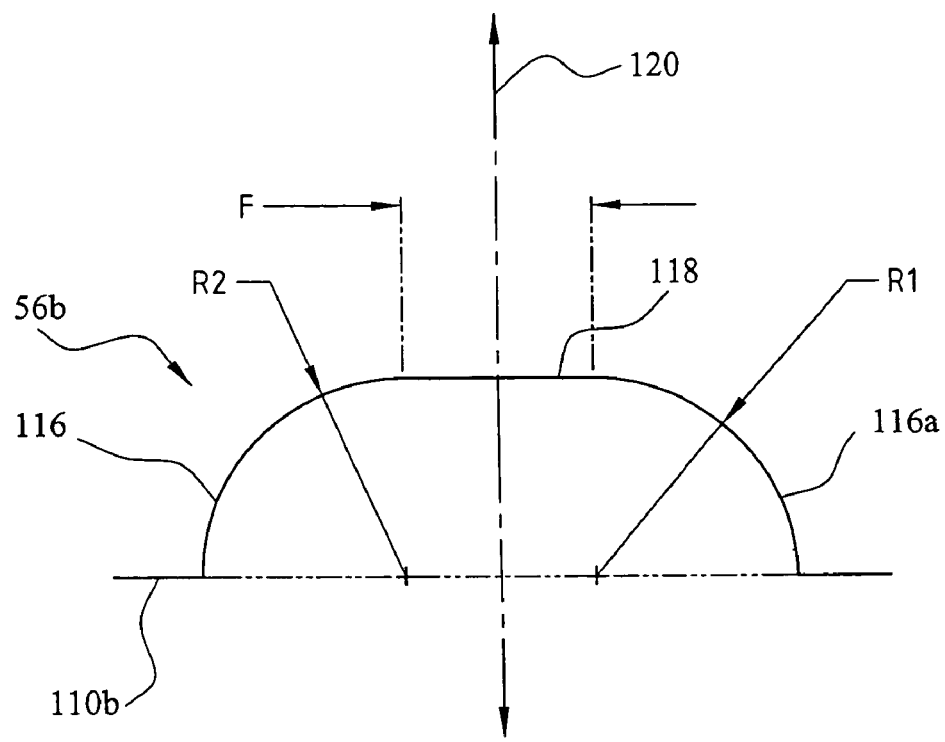
FIG. 11 is a cross-sectional view of a first embodiment of a rib according to the present invention.
Figure 12:
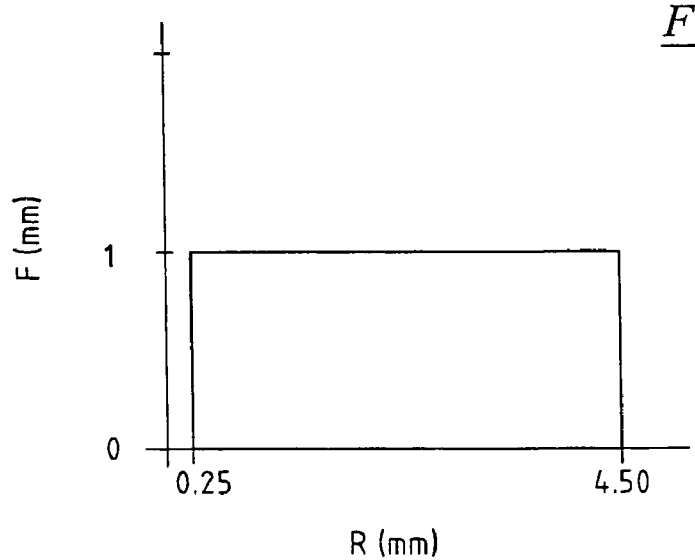
FIG. 12 is a graph of a range of dimensions for the rib shown in FIG. 11.

The rib can define several different cross-sections. Referring now to FIGS. 11–12, the cross-section of the rib 56b can include a pair of arcuate sides 116, 116a extending outwardly from the interior surface 110b. The arcuate sides 116, 116a can be disposed on opposite sides of a planar side 118. By way of example and not limitation, the radii R1, R2 of the sides 116, 116a can be between 0.25 mm and 4.50 mm. The planar side 118 does not have to extend parallel to the interior surface 110b. The planar side 118 can extend a distance F between the arcuate sides 116, 116a. By way of example and not limitation, the distance F can be between 0 mm and 1 mm, as shown in FIG. 12. The side 118 defines the valve seat of the film valve.

Figure 13:
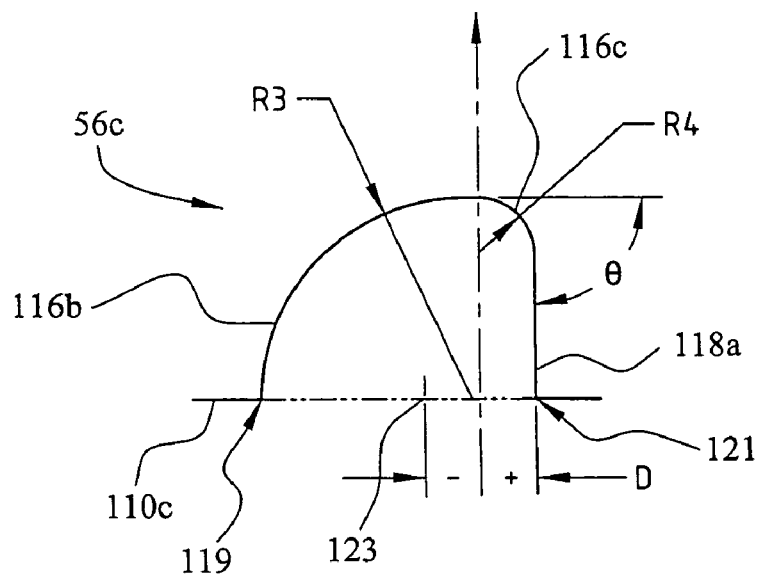
FIG. 13 is a cross-sectional view a second embodiment of a rib according to the present invention.
Figure 14:
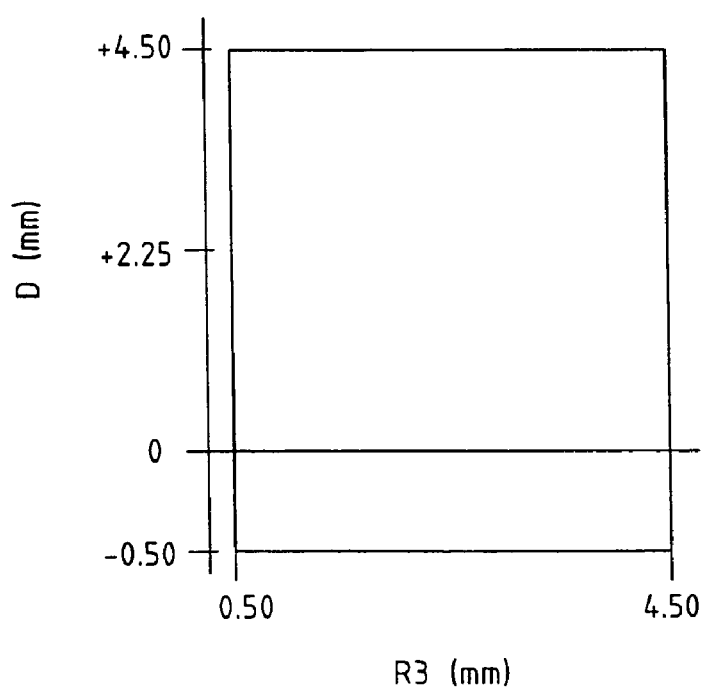
FIG. 14 is a graph of a range of dimensions for the rib shown in FIG. 13.

Referring now to FIG. 13, the cross-section of the rib 56c, can include a pair of arcuate sides 116b, 116c adjacent to one another. The first arcuate side 116b can extend outwardly from a point 119 defined on the interior surface 110c. The first and second arcuate sides 116b, 116c can define different radii R3, R4. By way of example and not limitation, the radius R3 can be between 0.5 mm and 4.50 mm. A planar side 118a can extend outwardly from a point 121 defined by the interior surface 110c to the arcuate side 116c. The side 118a can extend from the surface 110c at an angle Θ relative to the surface 110c. By way of example and not limitation, the angle Θ can be between thirty degrees and ninety degrees. The side 118a can extend from surface 110c at any point along a distance D. The distance D can be defined along the surface 110c between points 121 and 123. The second arcuate side 116c can extend between the first arcuate side 116b and the planar side 118a. The radius R4 of the second arcuate side 116c can be selected in response to the distance D, the radius R3, and the angle Θ. By way of example and not limitation, the radius R4 can be between 1 mm and 3 mm.

Figure 15:
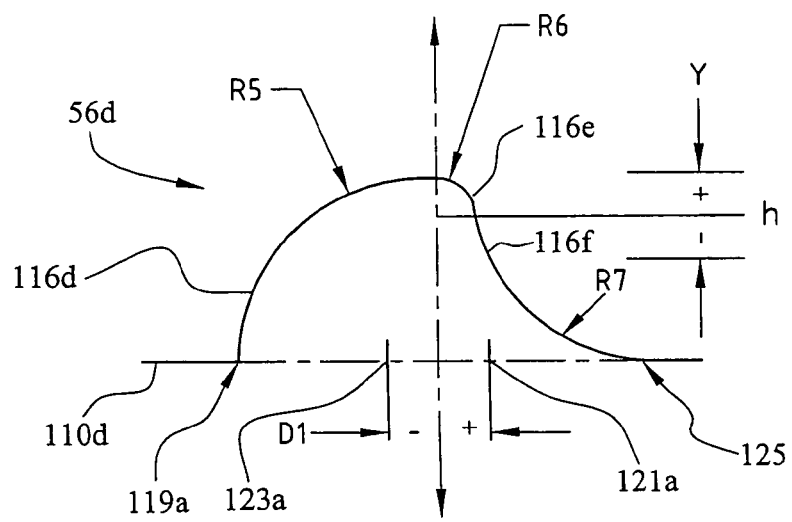
FIG. 15 is a cross-sectional view a third embodiment of a rib according to the present invention.
Figure 16:
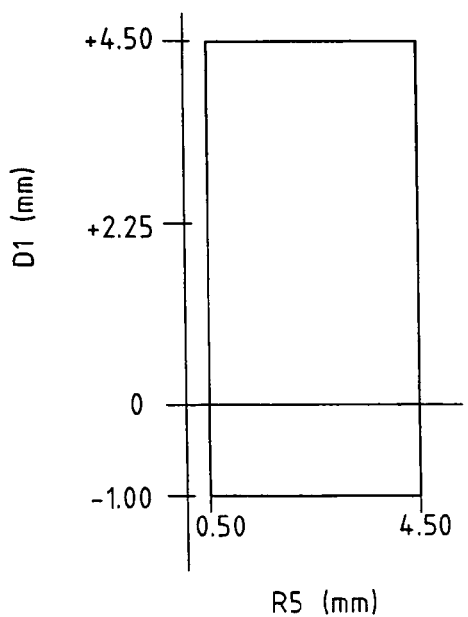
FIG. 16 is a graph of a range of dimensions for the rib shown in FIG. 15.
Figure 17:
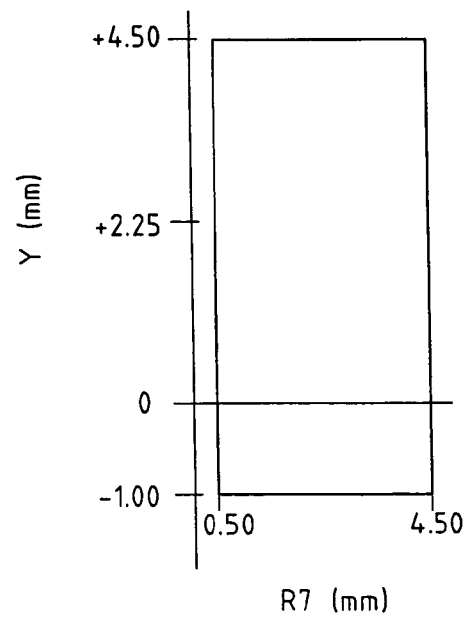
FIG. 17 is a graph of a range of dimensions for the rib shown in FIG. 15.

Referring now to FIG. 15, the rib 56d can include a first convex side 116d extending outwardly from a point 119a defined by the interior surface 110d. The convex side 116d can define a radius R5 having a center point positioned along a distance D1 between points 121a, 123a. By way of example and not limitation, the radius R5 can be between 0.5 mm and 4.5 mm. The rib 56d can also include a second convex side 116e defining a radius R6. By way of example and not limitation, the radius R6 can be between 1 mm and 3 mmm. The rib 56d can also include a concave side 116f extending outwardly from a point 125 defined by the interior surface 110d to the second convex side 116e. The side 116f can define a radius R7. By way of example and not limitation, the radius R7 can be between 0.5 mm and 4.5 mm. A height H can be defined above the surface 110d at the intersection of the surfaces 116e, 116f. A center point of the radius R7 can be located along the height H or can be offset from the height a distance Y. By way of example and not limitation, the distance Y can be between 1 mm closer to the surface 110d than the height H and 4.5 mm greater than the height H.

As shown in FIG. 11, the cross-section of the rib 56b can be symmetrical about a vertical axis 120 of the rib 56b. Alternatively, as shown in FIGS. 13 and 15, the ribs 56c, 56d can be asymmetrical about a vertical axis. The various ribs 56, 56a, 56b, 56c, 56d, 56f shown in the figures can have a constant cross-section or can have a variable cross-section.

The foregoing detailed description shows the preferred embodiments of the present invention are well suited to fulfill the objectives of the invention. It is recognized that those skilled in the art may make various modifications or additions to the preferred embodiments chosen herein to illustrate the present invention, without departing from the spirit of the present invention. It should also be recognized that any feature of the invention can be used in combination with any other feature of the invention. Accordingly, it is to be understood that the subject matter sought to be afforded protection should be deemed to extend to the subject matter defined in the appended claims, including all equivalents thereof.

The invention has been described in an illustrative manner, and it is to be understood that the terminology that has been used is intended to be in the nature of words of description rather than limitation. It will be apparent to those skilled in the art that many modifications and variations of the present invention are possible in light of the above teachings. Therefore, it is to be understood that the invention may be practiced otherwise than as specifically described within the scope of the amended claims.

What is claimed is:

1. A valve for a ventilation system of a motor vehicle comprising:
   a frame including an interior surface and a first aperture;
   a fabric member suspended across said first aperture; and
   a rib projecting from said interior surface and surrounding said first aperture for sealing engagement with said fabric member, said rib having a cross-section that includes a pair of arcuate sides extending outwardly from said interior surface.

2. The valve according to claim 1 wherein said cross-section of said rib includes a planar side between said arcuate sides.

3. The valve according to claim 2 wherein said planar side extends parallel to said interior surface.

4. The valve according to claim 1 wherein said cross-section of said rib is symmetrical about a vertical axis of said rib.

5. The valve according to claim 1 wherein the cross-section of said rib includes a first arcuate side extending outwardly from said interior surface and a planar side extending outwardly from said interior surface and a second arcuate side extending between said first arcuate side and said planar side.

6. The valve according to claim 5 wherein said first and second arcuate sides define different radii.

7. The valve according to claim 5 wherein said planar surface extends substantially perpendicular from said interior surface.

8. The valve according to claim 1 wherein the cross-section of said rib includes a first convex side extending outwardly from said interior surface and a concave side extending outwardly from said interior surface and a second convex side extending between said first convex side and said first concave side.

9. The valve according to claim 8 wherein said first convex side and said concave side and second convex side define different radii.

10. The valve according to claim 1 wherein said rib has a variable cross-section.

11. The valve according to claim 1 wherein said rib has a constant cross-section.

12. A valve for a ventilation system for a motor vehicle comprising:
    a housing including an inlet and an outlet and a mixing chamber adjacent said outlet;
    a frame connected to said housing at said outlet and including an interior surface and a first aperture communicating with said outlet of said housing;
    first and second drive rollers supported for rotation by said frame and disposed at opposite ends of said frame;
    an idle roller supported for rotation by said frame and disposed between said first and second drive rollers;
    a fabric member wound and unwound relative to said first and second rollers and suspended across said first aperture and extending between said idle roller and said interior surface of said frame; and
    a rib projecting from said interior surface and surrounding said first aperture for sealing engagement with said fabric member, said rib having a cross-section that includes a pair of arcuate sides extending outwardly from said interior surface.

13. The valve according to claim 12 wherein said idle roller is offset from the top of said rib a distance between 0.5 millimeter and 1 millimeter.

14. The valve according to claim 12 wherein said first arcuate side is a convex side and the second arcuate side is a concave side.

15. The valve according to claim 12 wherein said cross section of said rib includes a first a planar side extending between said first arcuate side and said second arcuate side.

* * * * *